Jan. 14, 1969  M. J. BUCHMAN  3,421,593
RAILROAD TRACK SCALE
Filed Sept. 2, 1965  Sheet 1 of 3
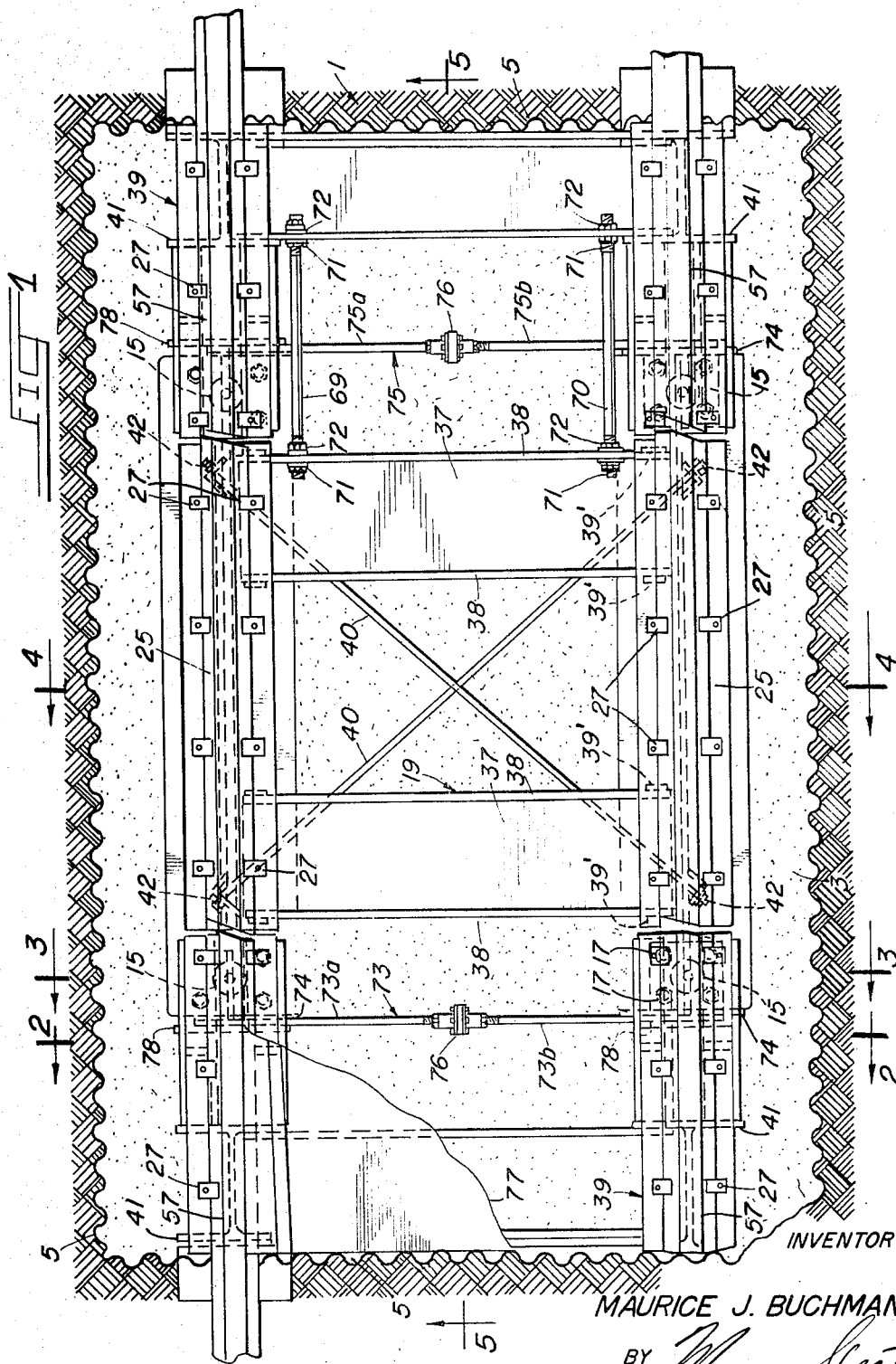
INVENTOR
MAURICE J. BUCHMAN
BY

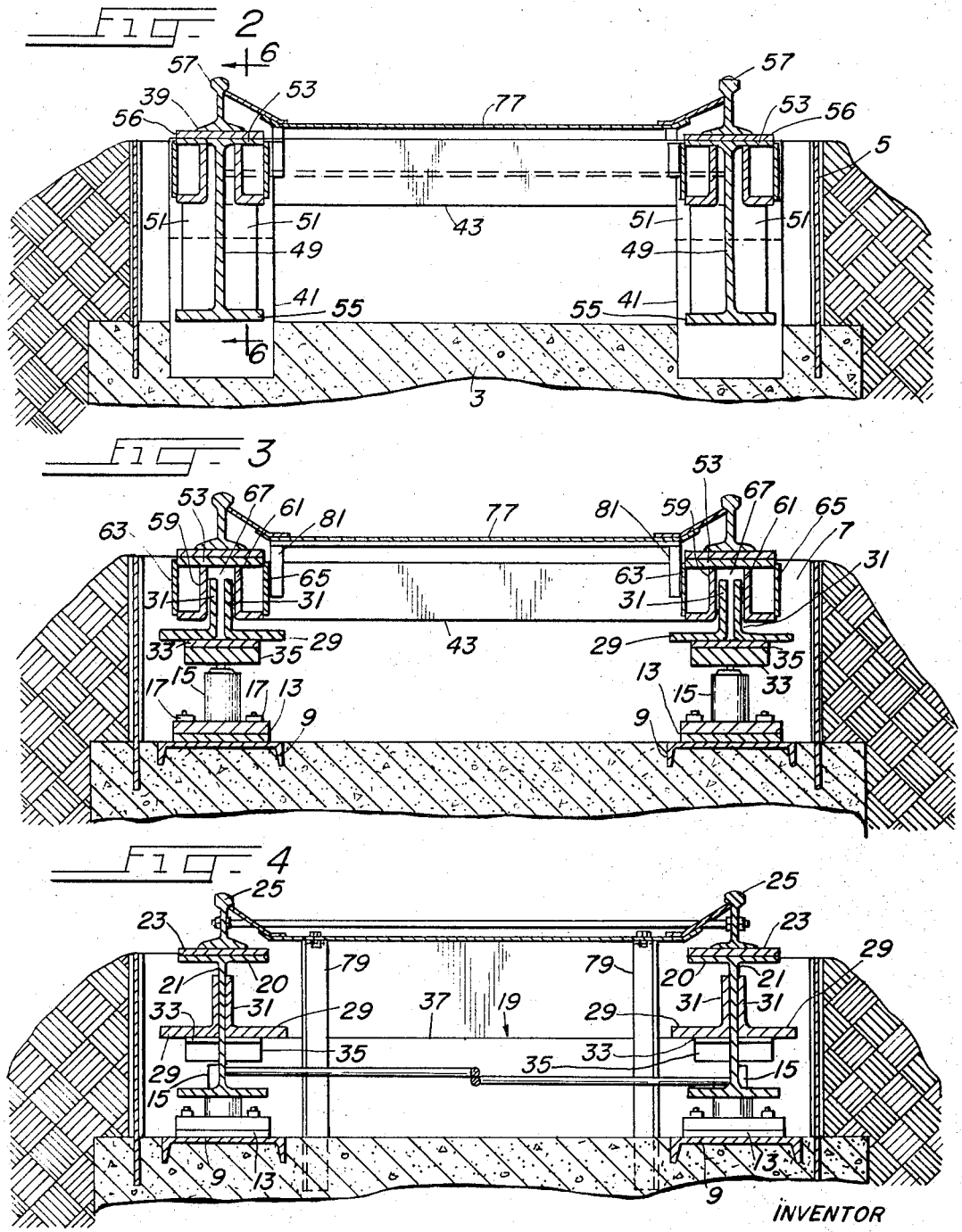

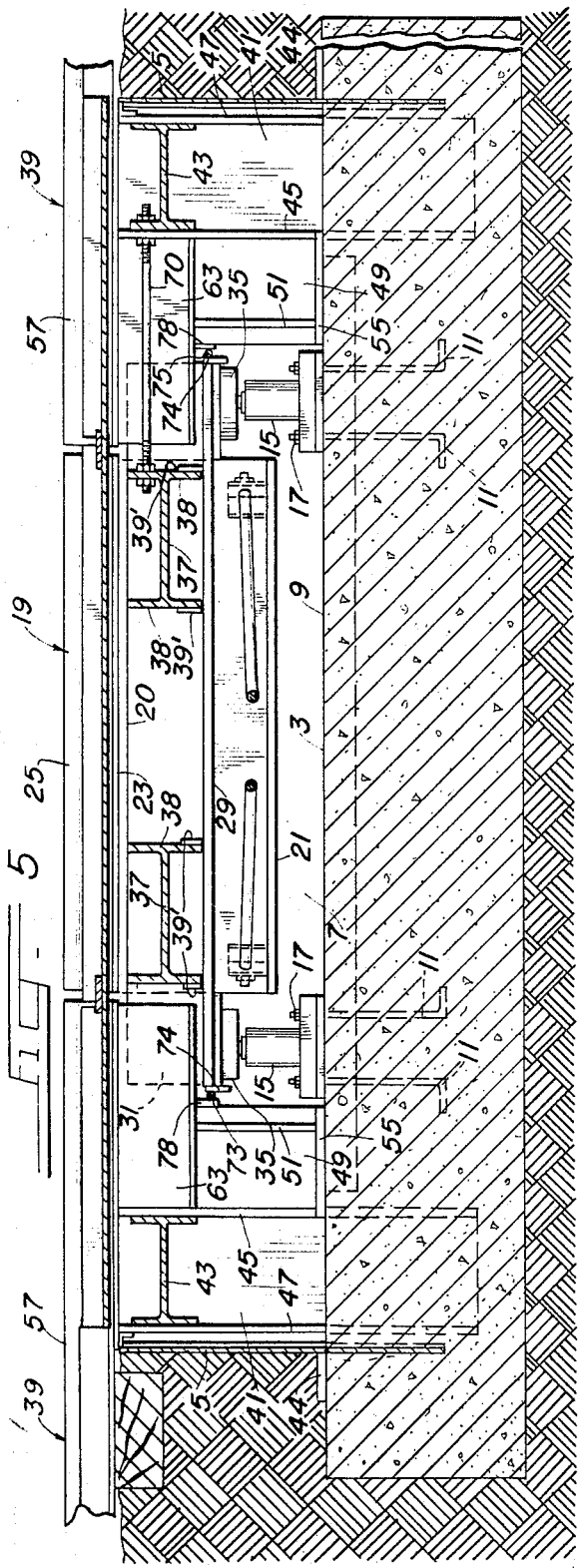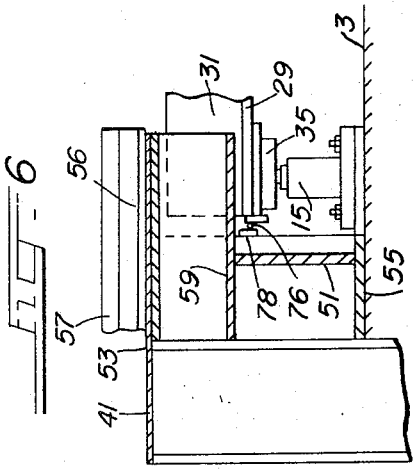

United States Patent Office 3,421,593
Patented Jan. 14, 1969

3,421,593
RAILROAD TRACK SCALE
Maurice J. Buchman, Chicago, Ill., assignor to International Railroads' Weighing Corporation, Northfield, Ill., a corporation of Illinois
Filed Sept. 2, 1965, Ser. No. 484,590
U.S. Cl. 177—134                    12 Claims
Int. Cl. G01g 19/06

ABSTRACT OF THE DISCLOSURE

A railroad track scale has a scale pit formed by a concrete slab and a corrugated earth-retaining side wall. Within the pit is a weighbridge and approach sections at each end thereof. The approach sections have columns that are embedded in the slabs and cantilevers that project from the columns and vertically overlap the ends of the weighbridge.

---

This invention relates to improvements in scales of the type used for weighing vehicles, such as railroad freight cars.

In the construction of railroad track scales, one of the principal costs is that of preparation of the scale site. Usually this involves an excavation nine feet or more in depth for the scale pit, plus an extensive amount of concrete work in connection with pouring of the slab and side walls that form the scale pit. Since construction of this character is costly, there is a reluctance on the part of the user of the scale to abandon it or move it to a more effective or convenient location.

An object of the present invention is to provide a track scale which requires only a relatively shallow excavation as well as considerably less concrete work than has heretofore been required. In a preferred embodiment of the present invention, an excavation of only about four feet in depth is required, and the scale is also constructed so as to eliminate the need for concrete side walls for the scale pit, thereby greatly reducing the cost of site preparation.

It is a further object of the present invention to provide a track scale of the type stated in which the ends of the weighbridge nest within the adjacent ends of the approach section at each end of the weighbridge to provide a vertical overlap which, among other things, reduces the overall height of the scale and permits the use of a shallow scale pit.

It is another object of the present invention to provide a track scale of the type stated in which the weighbridge, approach sections, and load cells for the scale can be moved at relatively low cost to another site.

It is also an object of the present invention to provide a railroad track scale of the type stated which is relatively short in overall length, and, therefore, may be installed at a relatively short section of straight track.

It is a further object of the present invention to provide a track scale of the type stated in which the weighbridge and approach sections may be fabricated away from the scale site and thereafter assembled as an integral unit for delivery and installation in the scale pit, thereby further reducing the overall cost of construction of the scale.

The attainment of the above and further objects of the present invention will be apparent from the following description taken in conjunction with the accompanying drawing forming a part thereof.

In the drawing:

FIG. 1 is a top plan view of a track scale constructed in accordance with and embodying the present invention.

FIGS. 2, 3, 4 and 5 are fragmentary sectional views taken along lines 2—2, 3—3, 4—4, and 5—5, respectively, of FIG. 1; and FIG. 6 is a fragmentary sectional view taken along lines 6—6 of FIG. 2.

Referring now in more detail to the drawing, 1 designates a railroad track scale having a concrete foundation slab 3 which may include steel reinforcing rods embedded therein. A suitable drain (not shown) may be provided in the slab and the surface of the slab may be pitched or grouted to slope toward the drain. Embedded in the foundation slab 3 is an upstanding encompassing non-load bearing wall 5 of corrugated sheet metal or the like which cooperates with the slab 3 to define a scale pit 7. Also embedded in the foundation slab 3 are longitudinally extending parallel base channels 9, 9, the webs of which are approximately flush with the upper surface of the slab 3. Also embedded in the foundation slab 3 and projecting upwardly through the base channels 9 are load cell anchor bolts 11. In the form of the invention shown there are four groups of anchor bolts 11 with each group containing four bolts. Each group of anchor bolts 11 also passes upwardly through a load cell base plate 13. Four load responsive devices, such as load cells 15 are employed with the scale and each load cell 15 rests on one of the base plates 13. A nut 17 is threaded onto the end of each anchor bolt 11 for removably securing the load cells 15 in place. These load cells 15 are used in conjunction with equipment for recording a weight on the weighbridge 19. In place of load cells, other suitable transducers or load responsive devices may be used.

The weighbridge 19 has longitudinally extending I-beam main girders 21, 21. On the upper flanges 20, 20 of the main girders 21, 21 rail base plates 23, 23 may be bolted or otherwise suitably secured. Weigh rails 25, 25 are, in turn, secured to the rail base plates 23, 23 by clips 27. Welded or otherwise rigidly secured to opposite sides of the web of each main girder 21 are reinforcing angles 29, 29 having vertical webs 31, 31. Each pair of reinforcing angles 29 extends beyond both ends of the associated girder 21, and the horizontal flanges of each pair of angles 29, 29 beyond each end of the girder 21 are joined by a plate 33 having a load cell contact plate 35 secured to its lower surface.

Welded to the main girders 21, 21 and extending therebetween are spaced parallel transverse connector I-beams 37, 37 which cooperate with the main girders 21, 21 to form a rigid box-like weighbridge frame. The flanges 38, 38 of the connector beams 37, 37 are vertical and extend between the upper flanges of the main girders 21, 21 and the horizontal flanges of the reinforcing angles 29, 29. Eye plates 39' may be welded to the flanges of the connector beams 37, 37 and to the flanges of the reinforcing angles 29, 29. If desired the weighbridge may have diagonal brace rods 40, 40 that project through the webs of the girders 21, 21 and are secured by nuts and lock washers assemblies 42.

At each end of the weighbridge 19 are approach sections 39, 39. In the form of the invention shown, the two approach sections 39, 39 are of the same construction. Each approach section has a pair of spaced upstanding I-beams which form end posts or columns 41, 41, the lower ends of which are embedded in the foundation slab 3. Welded to and extending between each pair of upstanding columns 41, 41 is a connector beam 43. The connector beam 43 is likewise an I-beam, and at the ends thereof its flanges lie between the flanges 45, 47 of the columns 41, 41. A post support angle 44 is joined to each of the columns 41, 41. Rigidly secured to the flanges 45 and projecting toward the weighbridge 19 are approach section main girders 49, 49. Plate stiffeners 51 extend between the horizontal leg of the angles 59, 59 and lower flanges 53, 55 of the main girders. The lower flanges 55 abut the floor of the foundation slab 3. The upper flange 53 extends inwardly in the direction of the weighbridge beyond the web and lower flange 55, and with the upper ends of the columns 41, support approach rail base plates 56 upon which are approach rails 57, 57 that lead to the weigh rail 25, 25. Like the weigh rails, the approach rails 57, 57 may be secured by clips 27 to their respective base plates 56. The ends of the approach rails that are remote from the weigh rails may be secured in a conventional manner to the rails that form a section of track in which the scale is located.

The upper flanges 53 of the main girders 49, 49 are each reinforced by angles 59, 61 and by plates 63, 65, the angles and plates in each girder being of a length approximately the same as that of the upper flange 53 and coextensive therewith. The angles 59, 61 and plates 63, 65 are secured to the top flange 53 and to each other to form a cantilever associated with each column 41. On each cantilever there is a recess 67 that opens downwardly and also toward the weighbridge to receive the vertical webs 31, 31 of the reinforcing angles 29, 29 on the adjacent main girders 21 of the weighbridge. Thus, there is a vertical overlap between the approach sections 39 and the weighbridge 19 which substantially reduces the overall height of the scale and the consequent need for a deep excavation.

When a railroad vehicle passes onto either of the approach sections, its weight is transmitted to the foundation slab 3 primarily by the approach section. There is no need to rely on a load-bearing side wall for the scale pit, as is ordinarily done to support the approach sections of the track scale. This permits the use of a relatively inexpensive side wall for the scale pit.

When a load is directly over the posts 41, 41 of an approach section, this load acts vertically and is transmitted to the slab by the lower flanges 55 and the post support angle 44. However, when there is a load on the cantilever portions of the approach section the vertical force is considerably offset from the lower flanges 55 and support angle. In this position the vertical force of the load creates a torque which is a product of the vertical load and the moment arm from there to the posts. This torque on the approach section is transmitted to the slab primarily through the embedded portions of the posts. As a result, the vertical load on the cantilevers is resisted primarily by generally horizontal forces in the slab that act on the embedded parts of the uprights.

It will also be noted that the load cells 15 are located outwardly beyond the ends of the weigh rails 25. Therefore, when a load is applied anywhere on a weigh rail, that load will always be between the load cells 15 so that the load on any point of a weigh rail always applies compression forces to the load cells associated with that weigh rail.

Extending between one of the connector beams 37 of the weighbridge and an adjacent connector beam 43 of one of the approach sections are spaced longitudinal check rods 69, 70. Each end of each check rod 69, 70 is threaded and adjustably secured to a flange 38 of one connector beam 37 and to an adjacent connector beam 43 by nuts 71, 72. Transverse check rods 73, 75 are also provided for preventing lateral or side movement of the weighbridge. Each check rod is preferably in two sections 73a, 73b, 75a, 75b with the adjacent ends of the two sections of each rod being secured together by a flanged turnbuckle coupling 76. Each of the other ends of the sections 73a, 73b, 75a, 75b is welded to plates 74, 78, there being two such sets of plates, one plate for each rod section. In each set of plates, one plate 74 is secured to the end of the weighbridge main girder reinforcing angles 29, 29 while the other plate 78 is secured to the end of the approach section. The longitudinal and transverse check rods are sufficiently thin so that they offer only negligible resistance to deflection of the weighbridge under maximum load, it being undersood that the deflection of the weighbridge 19 under maximum load is only about .003 inch.

Suitable decking 77 may be disposed over the scale pit 7. This decking 77 may be supported in any suitable manner and by deck posts 79 that are embedded in the foundation slab 3 and by deck supports 81 that are secured to the girders of the approach sections.

In fabricating the scale, the site may be excavated to a depth of about four feet and of appropriate length and width after which the concrete for the slab 3 may be poured. The slab may be about two feet deep. The base channels 9, 9, load cell anchor bolts 11 and deck support posts 79 are embedded in the concrete at the proper locations. Suitable removable molding cores are provided at predetermined locations so that the slab is cast with cavities for the four columns 41 and the corrugated wall 5.

The weighbridge 19 and approach sections 39, 39 may be prefabricated away from the scale site and then transported thereto. Prior to installing them in the scale pit, the load cells 15 may be secured in place by the nuts 17. The weighbridge 19 may be placed onto the load cells, and then the approach sections lowered into the pit so that the columns 41 drop into the holes in the slab that had been pre-formed for them. The approach sections 39, 39 will remain supported in a stable manner due to abutment with the slab of the lower flanges 55 of the approach section main girders as well as the abutment with the slab of the post support angle 44. The holes in which the columns have been placed may then be filled with concrete so as to embed the four columns 41 firmly in the slab 3. The longitudinal and transverse check rods may then be secured in their respective locations and adjusted as required. The bottom edge of the corrugated wall 5 may be placed in the pre-cast groove therefor in the slab 3 and the groove filled with concrete to secure the wall 5 in place.

Instead of first installing the weighbridge and then the approach sections, it is possible to pre-assemble the approach sections together with the weighbridge and the longitudinal and transverse check rods. This entire assembly may then be transported to the scale site and lowered into the pit with the four columns 41 being placed in their respective pre-formed holes in the foundation slab 3.

The length of the scale is relatively short which enables it to be installed along a relatively short section of straight track. For example, the weigh rails 25, 25 may each be of a length of about 5 feet 3¼ inches while the length of the scale at grade level is approximately twelve feet. Because of the short length of the weigh rails, the scale of the present invention may be used to weigh individual axle loads of freight cars moving across the scale.

Moving the scale to a new site may be effected in an economical manner. By use of a cutting torch, the four columns 41 may be cut at the concrete line whereupon the two approach sections and the weighbridge may be lifted out of the scale pit and transported as a unit to the new scale site. The lower ends of the approach section may be rebuilt to contain the portions of the columns 41 and girders 49 that were left at the old site. The new scale site may be prepared in a manner similar to the preparation of the old scale site. The load cells may be mounted in place before the weighbridge and approach sections are lowered into the new scale pit.

While the scale of the present invention is particularly suitable for weighing railroad vehicles, it will be apparent that the principles of the invention are applicable to the weighing of trucks and other automotive vehicles in which case the rails would be replaced with suitable ramps or the like, depending upon the nature of the vehicles to be weighed. Also the scale of the present invention could serve as a foundation for a roller-supported belt conveyor so that loads on the conveyor could pass over the scale and be weighed.

In compliance with the requirements of the patent statutes I have herein shown and described a preferred embodiment of the present invention. It should be understood, however, that the present invention is not limited to the precise construction shown herein and described, the same being merely illustrative of the principles of the present invention. What is new and desired to be secured by Letters Patent is:

1. A scale comprising a weighbridge, load responsive means in operative supporting contact with the weighbridge and responsive to weight on the weighbridge, an approach section at an end of the weighbridge and having means over which a load moves from the approach section to the weighbridge, and a foundation for supporting the approach section; the approach section having upstanding columns anchored to the foundation in spaced relation to the ends of the weighbridge, and a cantilever secured to each column with said means over which the load moves being supported thereon, each cantilever having a longitudinally extending recess and a part of each end of the weighbridge extending into the recess of the adjacent cantilever to provide a vertical overlap of the end of the weighbridge and the cantilevers.

2. A scale comprising a weighbridge, means responsive to weight on the weighbridge, and an approach section at an end of the weighbridge, said approach section having spaced parallel girders for supporting a load thereon that moves thereacross to the weighbridge, means for supporting the girders, the girders having recesses that open downwardly and also toward the weighbridge for receiving the adjacent end portions of the weighbridge to provide a vertical overlap therebetween.

3. A scale comprising a weighbridge, an approach section at an end of the weighbridge, said approach section having spaced parallel beams for means over which a load moves to the weighbridge, and means for supporting said beams, each beam having upper and lower flanges with a web joining the two, the beams each having an upper portion that includes the upper flange and which extends beyond the adjacent end of the lower remaining portion of the beam, each said upper portion including reinforcing structural means and forming a recess that opens downwardly and also toward the weighbridge for receiving an end of the weighbridge to provide a vertical overlap between the end of the weighbridge and the beams, load responsive means in operative contact with said end of the weighbridge, and means for removably supporting the load responsive means below said ends of the weighbridge.

4. A scale comprising a weighbridge and an approach section at each end of the weighbridge, means including a foundation slab forming a scale pit for housing the weighbridge and approach sections, the adjacent ends of the weighbridge and approach sections nesting within one another, and forming a vertical overlap, and load responsive means in operative supporting contact with the weighbridge, the combined depth of the pit and thickness of the slab being of the order of four feet.

5. A scale comprising a weighbridge, an approach section at an end of the weighbridge, a foundation slab, and a retaining wall projecting upwardly from the slab and forming therewith a scale pit for housing the approach section and the weighbridge, the approach section having a column separate and distinct from said retaining wall and being anchored to the slab, the approach section transmitting the load thereon to the slab when said load is on the approach section and the retaining wall being relatively weak in its load-bearing capacity as compared to the load-bearing capacity of the approach section.

6. A scale comprising a weighbridge, an approach section at each end of the weighbridge, a foundation slab, a retaining wall projecting upwardly from the slab and forming therewith a scale pit for housing the approach sections and the weighbridge, the approach sections each being supported entirely by the slab and having upstanding columns anchored to the slab and means forming part of each approach section and over which a load moves from the approach section to the weighbridge, each said means having downwardly opening recess means for receiving end portions of the weighbridge to provide a vertical overlap therebetween, means below said end portions of the weighbridge and responsive to weight on the weighbridge, and means removably supporting the last-named means on the slab, each approach section transmitting the load thereon to the slab when said load is on the approach section.

7. A railroad track scale comprising a weighbridge having weigh rails, an approach section at each end of the weighbridge and having approach rails leading to the weigh rails, means forming a scale pit for housing the weighbridge and approach sections, said means including a foundation slab, the approach sections having upstanding columns anchored to the foundation and means secured to each column and supporting the approach rails, means responsive to weight on the weighbridge, and means for removably supporting the last-named means on said slab below the weighbridge.

8. A scale comprising a foundation slab, means including said foundation defining a scale pit, a weighbridge, and an approach section adjacent to said weighbridge and having spaced upstanding columns in the scale pit and embedded in the foundation slab, cantilever means projecting from said columns and having means over which a load moves from the approach section to the weighbridge, a load carried by the cantilever means being opposed primarily by generally horizontal forces in the slab that act on the embedded portions of the approach section.

9. A scale comprising a foundation slab, an approach section having upstanding spaced apart columns anchored to the foundation slab, means above the foundation slab for joining the columns together, a beam secured to and projecting from each column and with the two beams being parallel, each beam having upper and lower flanges with a web joining the two, the upper flanges of the beams extending in a direction away from the columns an amount greater than that of the lower flanges and the web, and reinforcing means secured to those parts of the upper flanges that extend beyond the lower flanges and webs, said reinforcing means and said parts of the upper flanges that extend beyond the lower flanges forming cantilevers having recesses that open downwardly, and a weighbridge adjacent to said approach section and having portions projecting into said recesses and forming a vertical overlap between said portions and said cantilevers.

10. A railroad track scale comprising a weighbridge having longitudinally extending parallel girders for supporting weigh rails, load responsive means below the ends of the girders and in operative contact therewith to be responsive to weight on the weighbridge, said ends of the girders including vertical web means, an approach section at each end of the weighbridge and having beams for supporting approach rails that lead to the weigh rails, each beam having a recess that opens downwardly and also toward the weighbridge for receiving the web means at the ends of the weighbridge to provide a vertical overlap between the weighbridge and approach sections.

11. A scale comprising a weighbridge, an approach section at each end of the weighbridge and each having means over which a load moves to the weighbridge, a foundation slab for supporting the approach sections, a retaining wall projecting upwardly from the slab and forming therewith a scale pit that houses the weighbridge and approach sections, each approach section having upstanding columns embedded in the foundation in spaced relation to the ends of the weighbridge, and a beam secured to each column and projecting toward the weighbridge with the approach rails being supported by the beams, each beam having cantilever means, load responsive means in operative supporting contact with said weighbridge, and means by which the load responsive means is removably secured to the foundation slab, the load on the cantilever portions of an approach section being transmitted to the slab through the approach section such that the load is opposed primarily by generally horizontal forces in the slab that act on the embedded portions of the columns.

12. A railroad track scale comprising a weighbridge having weigh rails, an approach section at each end of the weighbridge and each having approach rails leading to the weigh rails, a foundation slab for supporting the approach sections, a retaining wall projecting upwardly from the slab and forming therewith a scale pit that houses the weighbridge and approach sections, each approach section having upstanding columns anchored to the foundation in spaced relation to the ends of the weighbridge, and a beam secured to each column and projecting toward the weighbridge with the approach rails being supported by the beams, each beam having a lower flange that is supported by the foundation slab and a cantilever above the flange and extending toward the weighbridge and with a space in the cantilever that opens downwardly and toward the weighbridge, the weighbridge having parallel girders for supporting the weigh rails, the ends of the girders including end vertical web means projecting into each space to provide a vertical overlap between the ends of the weighbridge and the cantilevers, load responsive means in operative supporting contact with said end portions, and means by which the load responsive means is secured to the foundation slab, the combined depth of the scale pit and depth of the slab being of the order of four feet.

References Cited

UNITED STATES PATENTS

| | | | |
|---|---|---|---|
| 2,543,794 | 3/1951 | Mayer | 177—7 |
| 3,101,800 | 8/1963 | Raskin | 177—1 |

ROBERT S. WARD, JR., *Primary Examiner.*

L. HAMBLEN, *Assistant Examiner.*

U.S. Cl. X.R.

177—132, 163, 255